(12) United States Patent
Spyrou et al.

(10) Patent No.: US 6,258,915 B1
(45) Date of Patent: Jul. 10, 2001

(54) SOLID POLYURETHANE HARDENERS HAVING TRIAZINE GROUPS, PROCESSES FOR PREPARING SUCH COMPOUNDS, AND THEIR USE

(75) Inventors: Emmanouil Spyrou, Marl; Stephan Kohlstruk, Recklinghausen; Holger Loesch, Herne, all of (DE)

(73) Assignee: Degussa-Huels Aktiengesellschaft, Frankfurt (DE)

( * ) Notice: Subject to any disclaimer, the term of this patent is extended or adjusted under 35 U.S.C. 154(b) by 0 days.

(21) Appl. No.: 09/431,225

(22) Filed: Nov. 1, 1999

(30) Foreign Application Priority Data

Nov. 5, 1998 (DE) ............................................. 198 50 970

(51) Int. Cl.$^7$ .................................................. C08G 18/80
(52) U.S. Cl. ................................. 528/45; 528/60; 528/65; 528/73; 525/124; 525/453; 544/223; 252/182.2; 252/182.22
(58) Field of Search ................................. 528/45.6, 73.65; 525/124, 453; 544/223; 252/182.2, 182.22

(56) References Cited

U.S. PATENT DOCUMENTS

| 5,143,994 | * | 9/1992 | Laas et al. | 528/45 |
| 5,523,376 | | 6/1996 | Hicks et al. | 528/44 |
| 5,719,240 | | 2/1998 | Gras et al. | 525/528 |
| 5,786,419 | | 7/1998 | Meier-Westhues et al. | 524/590 |
| 5,795,950 | | 8/1998 | Sugimoto et al. | 528/73 |

* cited by examiner

Primary Examiner—Rachel Gorr
(74) Attorney, Agent, or Firm—Oblon, Spivak, McClelland, Maier & Neustadt, P.C.

(57) ABSTRACT

Solid polyurethane hardeners (curing agents) having triazine groups, are prepared by reacting polyaddition compounds with a second compound having a >C=N— group. The polyaddition compounds are prepared by reacting a uretdione-functional polyisocyanate with a hydroxy-functional chain extender.

20 Claims, No Drawings

SOLID POLYURETHANE HARDENERS HAVING TRIAZINE GROUPS, PROCESSES FOR PREPARING SUCH COMPOUNDS, AND THEIR USE

BACKGROUND OF THE INVENTION

1. Field of the Invention

The invention relates to solid polyurethane hardeners (curing agents) having triazine groups, to processes for preparing such compounds and to their use for preparing plastics, especially powder coating materials which crosslink to give high-gloss or matt, light- and weather-stable coating films.

2. Discussion of the Background

Externally or internally blocked polyisocyanates which are solid at room temperature constitute useful crosslinkers for thermally crosslinkable polyurethane (PU) powder coating materials. For example, DE-C 27 35 497 describes PU powder coating materials having outstanding weathering and thermal stability. The crosslinkers whose preparation is described in DE-C 27 12 931 consist of E-caprolactam-blocked, isocyanurate-functional isophorone diisocyanate. Urethane-, biuret- or urea-functional polyisocyanates whose isocyanate groups are likewise blocked are also known.

The disadvantage of these purely externally blocked systems lies in the stoichiometric elimination of the blocking agent during the thermal crosslinking reaction. Since, the blocking agent is able to escape into the environment, it is necessary on ecological and workplace safety grounds to take special measures to clean the waste air and/or to recover the blocking agent. Moreover, the crosslinkers are of low reactivity, and curing temperatures of more than 170° C. are required.

DE-A 3030539 and DE-A 3030572 describe processes for preparing uretdione-functional polyaddition compounds whose terminal isocyanate groups are blocked irreversibly with monoalcohols or monoamines. The chain-terminating constituents of the crosslinkers are particularly disadvantageous, leading to low network densities of the PU powder coatings and thus to moderate solvent resistances.

Hydroxyl-terminated, uretdione-functional polyaddition compounds are the subject of EP 0669353. Because of their di-functionality they have improved solvent resistance. A common feature of the powder coating materials based on these uretdione-functional polyisocyanates is that they do not emit any volatile compounds in the course of the curing reaction. However, the stoving temperatures are high, at temperatures of 180° C. or more.

The use of amidines as catalysts in PU coating materials is described in EP 803 524. However, there is no chemical reaction of the PU hardener with the catalyst.

It is therefore an object of the present invention to provide low-emission PU hardeners of high reactivity which are particularly suitable for producing plastics and ecologically valuable powder coating materials.

SUMMARY OF THE INVENTION

The present invention provides solid PU hardeners having triazine groups, a melting point of from 40° to 130° C. and a free NCO content of less than 2% by weight, consisting of the reaction product of:

A) a polyaddition compound having at least one uretdione group and prepared by reaction of uretdione-functional polyisocyanates and hydroxyl-functional or amine-functional chain extenders, and B) a compound having at least one >C=N— group, the ratio of equivalents of the uretdione groups employed to the >C=N— group being between 1.0:0.05 and 1.0:1.0.

DETAILED DESCRIPTION OF THE INVENTION

The principle of this invention lies in the reaction of conventional uretdione-functional powder coating hardeners, or uretdione-functional polyaddition compounds prepared specifically for the purpose, with suitable compounds having at least one >C=N— group, such as imines or amidines, for example, to give new PU hardeners, with in some cases drastic changes in both physical and chemical properties (for example, melting point, glass transition temperature, NMR spectrum, reactivity). The ratio of equivalents of the uretdione groups employed to the >C=N— group varies between 1.0:0.05 and 1.0:1.0, inclusive of all values and subranges therebetween. Consequently, these novel hardeners belong to a group of mixed internally and externally blocked PU hardeners.

The compounds of the invention have an advantage over purely externally blocked powder coating hardeners, in that they release much less blocking agent and are more reactive. In addition, compounds of this invention have a much lower curing temperature, relative to the purely internally blocked powder coating hardeners.

Uretdione-functional polyisocyanates are well known and are described, for example, in U.S. Pat. Nos. 4,476,054, 4,912,210, 4,929,724 and EP 417 603. A comprehensive overview of industrially relevant processes for dimerizing isocyanates to uretdiones is given in J. Prakt. Chem. 336 (1994) 185–200. In general, the conversion of isocyanates to uretdiones takes place in the presence of soluble dimerization catalysts, such as dialkylaminopyridines, trialkylphosphines, phosphoramides or imidazoles. The reaction—optionally conducted in solvents but preferably in the absence of solvents—is stopped by adding catalyst poisons when a desired level of conversion is reached. Excess monomeric isocyanate is separated off subsequently by flash evaporation. If the catalyst is volatile enough, the reaction mixture can be freed from the catalyst at the same time as the monomer is separated off. In this case, the addition of catalyst poisons can be omitted. In principle, a broad range of isocyanates are suitable for preparing uretdione-functional polyisocyanates. For example, isophorone diisocyanate (IPDI), hexamethylene diisocyanate (HDI), 2-methylpentane diisocyanate (MPDI), 2,2,4-trimethylhexamethylene diisocyanate/2,4,4-trimethylhexamethylene diisocyanate (TMDI), norbornane diisocyanate (NBDI), methylenediphenyl diisocyanate (MDI) and tetramethylxylylene diisocyanate (TMXDI) are preferred.

The reaction of these uretdione-bearing polyisocyanates to give uretdione-functional polyaddition compounds involves the reaction of the free NCO groups with hydroxyl-containing monomers or polymers. For example, the hydroxyl-containing polymers may be polyesters, polythioethers, polyethers, polycaprolactams, polyepoxides, polyesteramides, or polyurethanes. Low molecular weight di-, tri- and/or tetra-alcohols, or alternatively, polyamines may be used as chain extenders, with or without monoamines and/or monoalcohols as chain terminators, as has been described, for example, in the patents EP 669 353, EP 669354, DE 3030572, EP 639 598 or EP 803524. By low molecular weight di-, tri- and/or tetra-alcohols is meant alcohols with a molecular weight that is less than approximately 1000 g/mole. Preferred uretdione-functional polyaddition compounds have a free NCO content of less than 2% by weight and a uretdione group content of from 3 to 17% by weight. In addition to the uretdione groups, the polyaddition compounds may also have isocyanurate, biuret, allophanate, urethane and/or urea structures.

Compounds suitable as component B are all those having at least one >C=N— group which are capable of reaction with component A. Examples thereof are imines, amidines, oxazolines, oximes or imidazoles.

Examples of preferred amidines suitable for preparing the PU hardeners of the invention are N,N-dimethyl-N'-phenylformamidine, 2-methyltetrahydropyrimidine, 1-acetyl-2-phenylimidazoline and 1-acetyl-2,4-dimethylimidazoline. Particular preference is given to N,N,N'-trisubstituted amidines, such as 1,5-diazabicyclo[4.3.0]non-5-ene (DBN) and 1,8-diazabicyclo[5.4.0]undec-7-ene (DBU). The preparation of such bicyclic amidines is described, for example, in EP 662 476.

The invention also provides a process for preparing compounds having triazine groups, which comprises reacting A) a starting compound having at least one uretdione group and B) a compound having at least one >C=N— group at temperatures of 20°–120° C.

The invention additionally provides a process for preparing solid PU hardeners having triazine groups, a melting point of 40°–130° C. and a free NCO content of less than 2% by weight by reacting:

A) a polyaddition compound having at least one uretdione group and prepared by reaction of uretdione-functional polyisocyanates and hydroxyl-functional or amine-functional chain extenders, and B) a compound having at least one >C=N— group at temperatures of 20°–120° C., the ratio of equivalents of the uretdione groups employed to the >C=N— group being between 1.0:0.05 and 1.0:1.0, inclusive of all values and subranges therebetween.

Triazines are known (H. Ulrich, R. Richter, Neue Methoden der praparativen Org. Chemie 1970, 6, 267). They have been prepared from imines or amidines in the reaction with isocyanates. What has not been described is the simple preparation of these triazines from a uretdione and a >C=N— group, such as an imine or amidine, for example. The reactants can be reacted with one another either in solvent or else in bulk, for example, continuously in an intensive kneading apparatus, in a single-screw or twin-screw extruder, at temperatures between 20° and 180° C. By NMR spectroscopy it is possible to see the disappearance of the C=N carbon atom signal and the appearance of characteristic signals of the triazine which is forming.

The reaction which takes place is as follows:

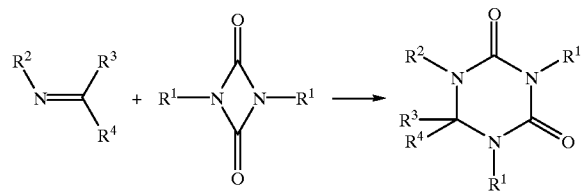

where R' describes the remaining constituents of the uretdione-functional compound employed and $R^2$–$R^4$ describe radicals of the compound containing at least one >C=N— group, so that by NMR spectroscopy at room temperature, less than 5% of the compound containing at least one >C=N— group can be detected in free form.

The advantage of this method of preparation is the guarantee that no free monomeric diisocyanates will occur in the formulation, which would be disadvantageous on toxicological grounds.

The present invention also provides for the use of the PU hardeners of the invention for preparing plastics, especially powder coating materials.

The invention also provides low-emission, transparent or pigmented powder coating materials comprising PU hardeners of this invention in combination with hydroxyl containing polymers. The hydroxyl-containing polymers are polyesters, polyethers, polyacrylates or polycarbonates having an OH number of 25–200 inclusive of all values and subranges therebetween, preferably polyesters having an OH number of 30–150, an average molecular weight of 500–600 and a melting point of between 40° and 130° C. inclusive of all values and subranges therebetween. Such binders have been described, for example, in EP 669 354 and EP 254 152. It is of course also possible to employ mixtures of such resins.

For the preparation of powder coating materials, the additives customary in powder coating technology, such as leveling agents, e.g., polysilicones or acrylates; light stabilizers, e.g., sterically hindered amines; pigments, e.g. titanium dioxide; and catalysts, e.g. dibutyltin dilaurate and tin octoate; or other auxiliaries, as described, for example, in the patent EP 669353, are added in a total amount of from 0.05 to 5%.

The ratio between blocked NCO groups of the powder coating hardener and OH groups of the resin is maintained in the range from 0.8:1 to 1.2:1 irrespective of whether the NCO groups are internally or externally blocked.

All of the constituents of the powder coating material can be homogenized in an appropriate apparatus, for example, a heatable kneading apparatus, but are preferably homogenized by extrusion, in the course of which upper temperature limits from 120° to 130° C. should not be exceeded. After the extruded mass has cooled to room temperature and has been appropriately comminuted, it is ground to give the ready-to-spray powder. The ready-to-spray powder can be applied to appropriate substrates by known techniques, such as by electrostatic powder spraying and unassisted or electrostatic fluidized-bed sintering. Following application of the powder, the coated workpieces are cured by heating for from 4 to 60 minutes at a temperature from 120° to 220° C., preferably for from 6 to 30 minutes at from 150° to 160° C.

The priority document of the present application, German patent application 19850970.7 filed Nov. 5, 1998, is herein incorporated by reference.

The subject-matter of the invention is illustrated below with reference to the examples.

EXAMPLES

TABLE 1

Materials

| Materials Used | Product Description, Manufacturer |
|---|---|
| VESTAGON BF 1540 | Polyisocyanate coating hardener, CREANOVA Spezialchemie GmbH, NCO content: 15.9%, m.p.: 98°–109° C., $T_g$:83° C. |
| ALFTALAT AN 739 | OH polyester, Hoechst AG, OH number: 53 |
| URALAC P 1480 | OH polyester, DSM, OH number: 27 |

TABLE 1-continued

Materials

| Materials Used | Product Description, Manufacturer |
|---|---|
| KRONOS 2160 | Titanium dioxide, Kronos |
| RESIFLOW PV 88 | Polymethylmethacrylate leveling agent, Worlee |
| Benzoin | Leveling agent, Aldrich |

OH number: consumption in mg KOH/g resin
m.p.: melting point
$T_g$: glass transition point Powder Coating Hardener A VESTAGON BF 1540 (CREANOVA Spezialchemie GmbH) (500 g) was dissolved in 400 ml of acetone, and 1,5-diazabicyclo[4.3.0]non-5-ene (DBN) (14.5 g) was added (ratio of equivalents uretdione/amidine=1.0:0.12). The solution was held at reflux for 1 h and then the solvent was removed under vacuum. The product had a melting point of 114°–116° C. and a $T_g$ of 85° C.

Powder Coating Hardener B

VESTAGON BF 1540 (CREANOVA Spezialchemie GmbH) (500 g) was dissolved in 400 ml of acetone, and 1,5-diazabicyclo[4.3.0]non-5-ene (DBN) (29 g) was added (ratio of equivalents uretdione/amidine=1.0:0.24). The solution was held at reflux for 1 h and then the solvent was removed under vacuum. The product had a melting point of 117°–120° C. and a $T_g$ of 87° C.

General Preparation Procedure for the Powder Coating Materials

The comminuted materials employed—powder coating hardeners of the invention, hydroxy-functional resins, leveling agents, catalysts—were intimately mixed in an edge runner mill and the mixture was then homogenized in an extruder at temperatures up to a maximum of 130° C. After cooling, the extrudate was fractionated and ground with a pin mill to a particle size of <100 μm. The powder prepared in this way was applied with an electrostatic powder spraying unit at 60 kV to degreased iron panels which were then stoved in a circulating air drying cabinet at temperatures between 150° and 180° C.

TABLE 2

Compositions

| Examples | Powder coating hardener | Amount [g] | OH comp. | Amount [g] | Pigment 35% |
|---|---|---|---|---|---|
| 1 | A | 129.5 | ALFTALAT AN 739 | 505.5 | 350 g $TiO_2$ |
| 2 | B | 132.9 | ALFTALAT AN 739 | 502.1 | 350 g $TiO_2$ |
| 3 | A | 83.4 | URALAC P 1480 | 511.6 | 350 g $TiO_2$ |
| C1* | VESTAGON BF 1540 | 126.6 | ALFTALAT AN 739 | 508.1 | 350 g $TiO_2$ |
| C2* | VESTAGON BF 1540 | 80.6 | URALAC P 1480 | 554.2 | 350 g $TiO_2$ |

*comparative examples not in accordance with the invention

In addition, 10 g of RESIFLOW and 5 g of benzoin were incorporated into each of the formulations.

TABLE 3

Coatings data

| Examples | Curing min/° C. | Indentation[a] [mm] | Layer Thickness [μm] | Note |
|---|---|---|---|---|
| 1 | 30/150 | 9.9 | 65–75 | fully cured |
| 1 | 20/160 | 10.8 | 50–60 | fully cured |
| 1 | 15/180 | 10.5 | 55–65 | fully cured |
| 2 | 30/150 | 10.1 | 50–60 | fully cured |
| 2 | 20/160 | 10.6 | 70–80 | fully cured |
| 2 | 15/180 | 11.1 | 55–60 | fully cured |
| 3 | 30/150 | 10.6 | 65–75 | fully cured |
| 3 | 20/160 | 10.4 | 65–70 | fully cured |
| 3 | 15/180 | 10.4 | 50–60 | fully cured |
| C1* | 30/150 | 0.3 | 70–80 | not fully cured |
| C1* | 20/160 | 0.5 | 65–76 | not fully cured |
| C1* | 15/180 | 10.1 | 60–70 | fully cured |
| C2* | 30/150 | 0.2 | 70–80 | not fully cured |
| C2* | 20/160 | 1.2 | 55–65 | not fully cured |
| C2* | 1'/180 | 10.6 | 55–60 | fully cured |

[a]Erichsen test, measured according to DIN 53156
*Comparative Examples not in accord with the invention Obviously, numerous modifications and variations of the present invention are possible in light of the above teachings. It is therefore to be understood that within the scope of the appended claims, the invention may be practiced otherwise than as specifically described herein.

What is claimed is:

1. A solid polyurethane hardener, comprising triazine groups that are the reaction product of:
    a polyaddition compound having at last one uretdione group, comprising a uretdione-functional polyisocyanate reacted with a hydroxyl-functional extender; and
    a second compound having at least one >C=N— group;
    wherein said triazine hardener has a melting point of 40° to 130°, a free isocyanate content of less than 2 weight %, and the ratio of equivalents of uretdione groups to >C=N— groups is between 1.0:0.5 and 1.0:1.0.

2. The polyurethane hardener of claim 1, said uretdione-functional polyisocyanate comprising at least one member selected from the group consisting of aliphatic polyisocyanates, cycloaliphatic polyisocyanates, aromatic polyisocyanates, heterocyclic polyisocyanates, and mixtures thereof.

3. The polyurethane hardener of claim 1, said uretdione-functional polyisocyanate further comprising at least one member selected from the group consisting of the uretdiones of isophorone diisocyanate, hexamethylene diisocyanate, 2-methylpentane-1,5-diisocyanate, 2,2,4-trimethylhexamethylene diisocyanate/2,4,4-trimethylhexamethylene diisocyanate, norbornane diisocyanate, methylenediphenyl diisocyanate, tetramethylxylylene diisocyanate, and mixtures thereof.

4. The polyurethane hardener of claim 1, said hydroxyl-functional extender comprising at least one member selected from the group consisting of polyesters, polythioethers, polyethers, polycaprolactones, polyepoxides, polyester amides, polyurethanes and low molecular weight di-, tri- and tetra-alcohols, and mixtures thereof.

5. The polyurethane hardener of claim 1, said polyaddition compound further comprising chain terminators.

6. The polyurethane hardener of claim 5, said chain terminators comprising at least one member selected from the group consisting of monoalcohols, monoamines, and mixtures thereof.

7. The polyurethane hardener of claim 1, wherein said polyaddition compound contains at least one functional group selected from the group consisting of isocyanurate, biuret, allophanate, urea, and combinations thereof.

8. The polyurethane hardener of claim 1, said second compound comprising at least one compound selected from the group consisting of imines, amidines, oxazolines, oximes, imidazoles, and mixtures thereof.

9. The polyurethane hardener of claim 8, wherein said amidine comprises at least one member selected from the group consisting of 1,5-diazabicyclo[4.3.0]non-5-ene, 1,8-diazabicyclo[5.4.0]undec-7-ene, and mixtures thereof.

10. A process for preparing compounds having triazine groups, comprising:
    reacting a first starting compound having at least one uretdione group with a second starting compound having at least one >C=N— group,
    wherein said reacting takes place at a temperature of 20° to 120° C.

11. A process for preparing a solid polyurethane hardener having triazine groups, comprising:
    reacting a polyaddition compound having at least one uretdione group, comprising a uretdione-functional polyisocyanate reacted with a hydroxyl-functional chain extender; with a second compound having at least one >C=N— group;
    wherein said triazine hardener has a melting point of 40° to 130° C., a free isocyanate content of less than 2 weight %, and the ratio of equivalents of uretdione groups to >C=N— groups is between 1.0:0.05 and 1.0:1.0.

12. The process of claim 10, wherein said reacting takes place without solvent.

13. The process of claim 11, wherein said reacting takes place without solvent.

14. A process for preparing plastics, comprising:
    reacting a prepolymer with said polyurethane hardener of claim 1,
    wherein said prepolymer is a polymer, oligomer or monomer, each containing at least one functional group reactive with said polyurethane hardener.

15. The process of claim 14, wherein said prepolymer is a hydroxyl-functional resin.

16. The process of claim 15, wherein said hydroxyl-functional resin comprises at least one member selected from the group consisting of polyhydroxy polyesters, polyhydroxy polyacrylates, and mixtures thereof.

17. The process of claim 16, wherein said polyhydroxy polyesters and said polyhydroxy polyacrylates have a hydroxyl number of 25 to 250 mg of KOH/g.

18. The process of claim 14, wherein said reacting takes place at a temperature of 120° to 220° C.

19. A plastic prepared by the process of claim 14.

20. A plastic prepared by the process of claim 16.

* * * * *